(12) United States Patent  
Amidon et al.

(10) Patent No.: US 8,346,864 B1  
(45) Date of Patent: Jan. 1, 2013

(54) SYSTEMS AND METHODS FOR SOCIAL NETWORK BASED CONFERENCING

(75) Inventors: Christopher Amidon, Apex, NC (US); Richard Walsh, Raleigh, NC (US); Alfredo Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1029 days.

(21) Appl. No.: 11/638,027

(22) Filed: Dec. 13, 2006

(51) Int. Cl.  
*G06F 15/16* (2006.01)

(52) U.S. Cl. .................. 709/204; 709/206; 709/224

(58) Field of Classification Search .................. 709/224, 709/204  
See application file for complete search history.

(56) References Cited

U.S. PATENT DOCUMENTS

| | | | |
|---|---|---|---|
| 5,220,657 A | 6/1993 | Bly et al. |
| 5,884,035 A | 3/1999 | Butman et al. |
| 6,073,138 A | 6/2000 | De l'Etraz et al. |
| 6,088,702 A | 7/2000 | Plantz et al. |
| 6,338,086 B1 | 1/2002 | Curtis et al. |
| 6,421,439 B1 | 7/2002 | Liffick |
| 6,442,693 B1 | 8/2002 | Sandgren et al. |
| 6,480,885 B1 | 11/2002 | Olivier |
| 6,519,629 B2 | 2/2003 | Harvey et al. |
| 6,525,747 B1 | 2/2003 | Bezos |
| 6,594,693 B1 | 7/2003 | Borwankar |
| 6,630,944 B1 | 10/2003 | Kakuta et al. |
| 6,651,086 B1 | 11/2003 | Manber et al. |
| 6,748,420 B1 | 6/2004 | Quatrano et al. |
| 6,757,517 B2 | 6/2004 | Chang |
| 6,816,906 B1 | 11/2004 | Icken et al. |
| 6,832,245 B1 | 12/2004 | Isaacs et al. |
| 6,970,444 B2 | 11/2005 | Chwieseni et al. |
| 6,988,096 B2 | 1/2006 | Gupta et al. |
| 6,988,127 B2 | 1/2006 | Matsuda et al. |
| 6,993,564 B2 | 1/2006 | Whitten, II |
| 7,016,307 B2 | 3/2006 | Vasudev |
| 7,058,897 B2 | 6/2006 | Matsuda |
| 7,069,308 B2 | 6/2006 | Abrams |
| 7,103,634 B1 | 9/2006 | Ullmann et al. |
| 7,107,317 B2 | 9/2006 | Demsky et al. |
| 7,188,140 B1 * | 3/2007 | Greenspan et al. ........... 709/204 |
| 7,328,242 B1 * | 2/2008 | McCarthy et al. ........... 709/204 |
| 7,359,894 B1 | 4/2008 | Liebman et al. |
| 7,689,556 B2 | 3/2010 | Garg et al. |
| 7,698,301 B2 | 4/2010 | Lourdeaux |
| 7,720,916 B2 | 5/2010 | Fisher et al. |
| 2002/0032634 A1 | 3/2002 | Abrams et al. |
| 2002/0057284 A1 | 5/2002 | Dalby et al. |
| 2002/0091556 A1 | 7/2002 | Fiala et al. |

(Continued)

OTHER PUBLICATIONS

Home page for www.myspace.com (accessed Jul. 13, 2007)—1 page.

(Continued)

*Primary Examiner* — Sulaiman Nooristany  
(74) *Attorney, Agent, or Firm* — Withrow & Terranova, PLLC

(57) ABSTRACT

Computer-based systems and methods provide additional management options for members of social networks whereby the members can define and participate in conferences, with the extent of the participation and messaging within such conferences based on the structure of the underlying social network(s). Metadata sent by participants includes one or more distribution parameters, with the parameter(s) specifying the extent to which a message is distributed within a conference and/or the extent of participation in the conference. In some embodiments, replies to messages cannot extend beyond the original recipient list, but may be further limited. Embodiments of a client interface for use in social networking conference systems are disclosed, and may include threaded chat areas and content sharing areas.

9 Claims, 5 Drawing Sheets

U.S. PATENT DOCUMENTS

| | | |
|---|---|---|
| 2002/0091667 A1 | 7/2002 | Jaipuria et al. |
| 2002/0091975 A1 | 7/2002 | Redlich et al. |
| 2002/0116466 A1 | 8/2002 | Trevithick et al. |
| 2002/0169737 A1 | 11/2002 | Armstrong et al. |
| 2002/0178164 A1 | 11/2002 | Wisniewski |
| 2003/0014482 A1 | 1/2003 | Toyota et al. |
| 2003/0028596 A1 | 2/2003 | Toyota et al. |
| 2003/0050976 A1 | 3/2003 | Block et al. |
| 2003/0050977 A1 | 3/2003 | Puthenkulam et al. |
| 2003/0135576 A1 | 7/2003 | Bodin |
| 2003/0167324 A1 | 9/2003 | Farnham et al. |
| 2003/0171941 A1 | 9/2003 | Kraenzel et al. |
| 2003/0212680 A1 | 11/2003 | Bates et al. |
| 2003/0220975 A1 | 11/2003 | Malik |
| 2003/0220980 A1 | 11/2003 | Crane |
| 2004/0015553 A1 | 1/2004 | Griffin et al. |
| 2004/0024719 A1* | 2/2004 | Adar et al. ............ 706/12 |
| 2004/0024892 A1 | 2/2004 | Creswell et al. |
| 2004/0044774 A1 | 3/2004 | Mngalik et al. |
| 2004/0088325 A1 | 5/2004 | Elder et al. |
| 2004/0122822 A1 | 6/2004 | Thompson et al. |
| 2004/0122855 A1 | 6/2004 | Ruvolo et al. |
| 2004/0137882 A1 | 7/2004 | Forsyth |
| 2004/0148275 A1 | 7/2004 | Achlioptas |
| 2004/0161090 A1* | 8/2004 | Digate et al. ............ 379/202.01 |
| 2004/0205358 A1 | 10/2004 | Erickson |
| 2004/0215793 A1 | 10/2004 | Ryan et al. |
| 2004/0237045 A1 | 11/2004 | Meltzer |
| 2004/0249768 A1 | 12/2004 | Kontio et al. |
| 2004/0267625 A1 | 12/2004 | Feng et al. |
| 2005/0015357 A1 | 1/2005 | Shahidi |
| 2005/0031096 A1 | 2/2005 | Postrel |
| 2005/0091289 A1 | 4/2005 | Shappell et al. |
| 2005/0091316 A1 | 4/2005 | Ponce et al. |
| 2005/0097170 A1 | 5/2005 | Zhu et al. |
| 2005/0114783 A1 | 5/2005 | Szeto |
| 2005/0138430 A1 | 6/2005 | Landsman |
| 2005/0149621 A1 | 7/2005 | Kirkland et al. |
| 2005/0159970 A1 | 7/2005 | Buyukkokten et al. |
| 2005/0165726 A1 | 7/2005 | Kawell, Jr. et al. |
| 2005/0171799 A1 | 8/2005 | Hull et al. |
| 2005/0171832 A1 | 8/2005 | Hull et al. |
| 2005/0171954 A1* | 8/2005 | Hull et al. ............ 707/10 |
| 2005/0171955 A1 | 8/2005 | Hull et al. |
| 2005/0172001 A1 | 8/2005 | Zaner et al. |
| 2005/0172116 A1 | 8/2005 | Burch et al. |
| 2005/0177385 A1 | 8/2005 | Hull et al. |
| 2005/0177614 A1 | 8/2005 | Bourne |
| 2005/0197846 A1* | 9/2005 | Pezaris et al. ............ 705/1 |
| 2005/0198131 A1 | 9/2005 | Appelman et al. |
| 2005/0198172 A1 | 9/2005 | Appelman et al. |
| 2005/0198305 A1* | 9/2005 | Pezaris et al. ............ 709/227 |
| 2005/0201290 A1 | 9/2005 | Vasudev et al. |
| 2005/0203801 A1 | 9/2005 | Morgenstern et al. |
| 2005/0210104 A1 | 9/2005 | Torvinen |
| 2005/0210409 A1 | 9/2005 | Jou |
| 2005/0215660 A1 | 9/2005 | Tomikawa et al. |
| 2005/0216300 A1 | 9/2005 | Appelman et al. |
| 2005/0216550 A1 | 9/2005 | Paseman et al. |
| 2005/0232423 A1 | 10/2005 | Horvitz et al. |
| 2005/0234864 A1 | 10/2005 | Shapiro |
| 2005/0243736 A1 | 11/2005 | Faloutsos et al. |
| 2005/0246420 A1 | 11/2005 | Little, II |
| 2005/0251553 A1 | 11/2005 | Gottfried |
| 2005/0256866 A1 | 11/2005 | Lu et al. |
| 2005/0256909 A1 | 11/2005 | Aboulhosn et al. |
| 2005/0262199 A1 | 11/2005 | Chen et al. |
| 2005/0262530 A1 | 11/2005 | Ruetschi et al. |
| 2005/0266835 A1 | 12/2005 | Agrawal et al. |
| 2005/0267766 A1 | 12/2005 | Galbreath et al. |
| 2005/0267940 A1 | 12/2005 | Galbreath et al. |
| 2005/0268329 A1 | 12/2005 | Lee et al. |
| 2005/0283497 A1 | 12/2005 | Nurminen et al. |
| 2006/0004789 A1 | 1/2006 | Lunt et al. |
| 2006/0004892 A1 | 1/2006 | Lunt et al. |
| 2006/0015588 A1 | 1/2006 | Achlioptas et al. |
| 2006/0026235 A1 | 2/2006 | Schwarz et al. |
| 2006/0036641 A1 | 2/2006 | Brydon et al. |
| 2006/0036766 A1 | 2/2006 | Baupin |
| 2006/0048059 A1 | 3/2006 | Etkin |
| 2006/0053380 A1 | 3/2006 | Spataro et al. |
| 2006/0063552 A1 | 3/2006 | Tillet et al. |
| 2006/0064431 A1 | 3/2006 | Kishore et al. |
| 2006/0085248 A1 | 4/2006 | Arnett et al. |
| 2006/0090137 A1 | 4/2006 | Cheng et al. |
| 2006/0095514 A1 | 5/2006 | Wang et al. |
| 2006/0095976 A1 | 5/2006 | Torres et al. |
| 2006/0117378 A1 | 6/2006 | Tam et al. |
| 2006/0121987 A1 | 6/2006 | Bortnik et al. |
| 2006/0121988 A1 | 6/2006 | Reville et al. |
| 2006/0123082 A1* | 6/2006 | Digate et al. ............ 709/205 |
| 2006/0123127 A1 | 6/2006 | Littlefield |
| 2006/0136419 A1 | 6/2006 | Brydon et al. |
| 2006/0143068 A1 | 6/2006 | Calabria |
| 2006/0143183 A1 | 6/2006 | Goldberg et al. |
| 2006/0143236 A1 | 6/2006 | Wu |
| 2006/0146765 A1 | 7/2006 | Van De Sluis et al. |
| 2006/0155813 A1 | 7/2006 | Dietz et al. |
| 2006/0173838 A1 | 8/2006 | Garg et al. |
| 2006/0173957 A1 | 8/2006 | Robinson et al. |
| 2006/0173963 A1 | 8/2006 | Roseway et al. |
| 2006/0173985 A1 | 8/2006 | Moore |
| 2006/0184464 A1 | 8/2006 | Tseng et al. |
| 2006/0184997 A1 | 8/2006 | La Rotonda et al. |
| 2006/0190536 A1 | 8/2006 | Strong et al. |
| 2006/0195462 A1 | 8/2006 | Rogers |
| 2006/0200434 A1 | 9/2006 | Flinn et al. |
| 2006/0200435 A1 | 9/2006 | Flinn et al. |
| 2006/0209727 A1 | 9/2006 | Jennings, III et al. |
| 2006/0218225 A1 | 9/2006 | Hee Voon et al. |
| 2006/0218577 A1 | 9/2006 | Goodman et al. |
| 2006/0234735 A1* | 10/2006 | Digate et al. ............ 455/466 |
| 2006/0248458 A1 | 11/2006 | Li |
| 2006/0259982 A1 | 11/2006 | Upendran |
| 2007/0173325 A1 | 7/2007 | Shaw et al. |
| 2007/0179945 A1 | 8/2007 | Marston et al. |
| 2007/0198648 A1* | 8/2007 | Allen et al. ............ 709/207 |
| 2007/0282887 A1* | 12/2007 | Fischer et al. ............ 707/102 |
| 2008/0046976 A1* | 2/2008 | Zuckerberg ............ 726/4 |

OTHER PUBLICATIONS

Home page for www.facebook.com (accessed Jul. 13, 2007)—1 page.

Homepage for www.friendster.com (accessed Jul. 13, 2007)—1 page.

Homepage for www.huminity.com/English/software.html (accessed Jul. 13, 2007)—2 pages.

Homepage for www.foaf-project.org (accessed Jul. 13, 2007)—1 page.

Homepage for www.gaim.sourceforge.net (accessed Mar. 1, 2007—3 pages.

http://pidgin.im/pidgin/home (redirected from http://gaim.sourceforge.net) (accessed Jul. 13, 2007)—1 page.

http://en.wikipedia.orq/wiki/Dijkstra%27s_algorithm (accessed Sep. 5, 2007)—3 pages.

Amidon et al., U.S. Appl. No. 11/526,955, filed Sep. 26, 2006, "Systems and Methods for Discovering, Creating, Using and Managing Social Network Circuits".

Amidon et al., U.S. Appl. No. 11/607,775, filed Dec. 1, 2006, "Systems and Methods for Subdividing and Securing Social Network Circuits".

Issa et al., U.S. Appl. No. 11/639,104, filed Dec. 14, 2006, "System and Method of Sharing Content Among Multiple Social Network Nodes Using an Aggregation Node".

* cited by examiner

SYSTEMS AND METHODS FOR SOCIAL NETWORK BASED CONFERENCING

RELATED APPLICATION

The present application is related to U.S. patent application Ser. No. 11/526,955, filed on Sep. 26, 2006, entitled "Systems and Methods for Discovering, Creating, Using, and Managing Social Network Circuits," which is incorporated herein by reference in its entirety.

BACKGROUND OF THE INVENTION

The increased availability of network-capable computing devices has led to a wide variety of communication options for users. Users can exchange messages and content through various communication systems including e-mail, instant messaging, chat rooms, bulletin and discussion boards, file sharing applications, and blogs and other web sites. For example, instant messaging systems such as Internet Relay Chat (IRC), ICQ, AOL Instant Messenger, Yahoo! Messenger, and Microsoft's MSN Messenger are widely used by many users on the Internet. Similar systems are available for messaging within local networks, as well.

Various arrangements of the previously-listed (and other) communication systems have been proposed for use in so-called "social networking" systems. Generally speaking, a "social network" refers to a group of persons or other entities ("members") linked to one another through one or more types of social connections. Social networks are also commonly referred to as "friend-of-a-friend" networks, although social networks may of course include or consist entirely of entities linked by social connections other than friendship. For example, a social network can include members linked to one another by connections including common friendship, place or field of employment, place of education, place of residence, membership in a club or other group, or common hobbies or topical interests. Many social networking systems attempt to provide computer-based tools for maintaining, enhancing, and creating social networks.

For example, social networking web sites provide users with web space to create a profile and link to various other users designated as "friends." See, for example, MySpace, Facebook, and Friendster. Users of such sites can post messages and other content to web pages accessible to various parties of their choosing (for example, to "friends only" or to the public at large). Social networking sites may also utilize instant messaging and online chat rooms that allow for near-instantaneous communication between users.

Recent developments in the field of social networking and online communication have been directed towards providing tools for users to create, manage, and explore social networks. For instance, mapping of social networks has been proposed based on correlating contact lists. A user can then explore various social networks of which the user is a part by using the resulting map, diagram, or other representation. For example, a user may use social networking tools to discover that friends of one or more of the user's friends (heretofore unknown to the user) may share common interests. The user may then pursue a closer relationship with the newly found friends-of-a-friend, for example, by discussing topics and sharing content of common interest with both the user's newly-found and original friends. As another example, tools such as Huminity may "traverse" a social network based on buddy or contact lists and provide a representation of the social network.

Social networking sites (and other tools) may provide some indication of changes in social networks over time. For example, as noted above, a social networking site may provide a representation such as a diagram or list of a user's friends, colleagues and other social network members. The social networking site may even update the diagram or list frequently. For instance, the social networking site or system may nearly-instantaneously update the user's social network when the user sends a message to a new friend or contact or when the user deletes a friend or contact.

Many social networking sites and other tools may provide an indicator as to whether a user is online or otherwise available. For example, instant messaging applications frequently provide "buddy lists" that indicate whether a contact is online, online-but-idle, or offline. Some instant messaging applications further indicate when a contact is preparing a message. For example, the open-source messaging application Gaim (Sourceforge) provides an indicator in a user's instant message window when the other party to the messaging session is typing a message.

Various tools and systems are directed toward facilitating online collaboration. Users may establish online chat rooms using, for example, variants of IRC and IM systems. Additionally, refinements in messaging tools (such as IM tools) have been directed towards management of online communication. For example, U.S. Patent Application Publication No. 2006/0090137 includes discussion of threaded text chat systems. Other online messaging/chat systems allow users to specify parameters so as to block access or views of messages from other users.

Communication tools that utilize data available from social network systems have also been proposed. For example, in some such systems, a user may direct announcements or sales pitches toward members of a social network based on member parameters, such as degree of separation or member characteristics, such as demographic groupings or group membership. Other proposed systems may use social network data to block messages based on similar parameters, for example, in order to recognize and/or to filter out spam messages.

Still further communication tools that utilize social network data include those that include social network circuit functionality. For example, systems such as those discussed in U.S. patent application Ser. No. 11/526,955, filed Sep. 25, 2006 and assigned to Qurio Holdings, Inc., allow users to discover, create, and manage active communications within and throughout social networks as the communications occur.

However, additional modes, configurations, and methods of online collaboration remain desirable, especially with regard to leveraging data available from presently-existing (and-ever expanding) social networks.

SUMMARY OF THE INVENTION

Objects and advantages of the present invention will be apparent to one of skill in the art upon careful review of the disclosure. Such objects and advantages include providing systems and methods for users to conduct online conferences based on underlying social network structures.

Using the presently disclosed technology, a user can specify the nature and extent of a conference amongst members of a social network based on various parameters, including social network parameters. Once a conference has been initiated, users participating in the conference can direct messages to desired users in the conference based on the same and/or other parameters. In operation, one or more computing devices determine which users receive messages by evaluating the parameters. For example, social network parameter(s) may be compared to data defining relationships between users of the underlying social network(s). The relationship data may be obtained from data defining static social networks and/or dynamic social networks (such as social network circuits).

Users may participate in social network conferences by way of any suitable communication technique(s). For example, conferences may comprise textual messages, such as instant message (IM) and short message service (SMS) messages. Conferences may comprise audio messages, such as voice chat via streamed audio content, shared audio files, telephone (including VoIP, cellular, or other telephonic communication), or other suitable technique. Conferences may comprise video messages, such as video chat via streamed video, shared video files, or other suitable techniques. Of course, combinations of the foregoing (and additional communication techniques) may be used in conferencing.

For purposes of this disclosure, the term "conferencing system" is used to refer to components arranged to provide social network conferencing functionality. Conferencing functionality may be provided by a separate communication system dedicated to conferencing or may be provided as a component in a larger communication system.

A method of managing a social network conference can include accessing conference metadata, the conference metadata including data identifying one or more members of a social network and at least one distribution parameter. The conference metadata may be provided, for example, by a user who wishes to initiate a social network conference. However, the conference metadata may be accessed as part of a routine (such as a conferencing system process run at regular or irregular intervals) that establishes conferences or as part of another process. In any event, the method further comprises accessing social network data identifying relationships between members of the social network. Based on the social network data and the distribution parameter(s), multiple other users may be identified for inclusion in a social network conference. Once the other users have been identified, the social network conference is tracked, including storing data defining the conference in at least one computer-readable medium.

For example, a first user may provide one or more distribution parameter(s) that identify inclusion or exclusion rules, such as a desired degree of separation (relative to the first user) restricting which other users are to be included in the conference. Based on the parameter(s), the conferencing system may determine which social network users fall within the desired degree of situation and include them in the social network conference.

A method of communicating a message to one or more users participating in a social network conference can include receiving a message and related message metadata from at least one sending user participating in the conference. The message metadata can identify the social network conference and one or more distribution parameters for the message. Based on the message metadata and data defining the social network, a recipient list can be determined and the message can be sent to the user(s) in the recipient list. For example, the recipient list may include all members currently participating in the conference; alternatively, the recipient list may only include a subgroup of conference participants.

A message may be communicated in reply to a previously-sent message in a similar manner. When a reply message is sent, the message metadata can further include data identifying the previously-sent message. The recipient list of the previously-sent message can be factored into the determination of the recipient list for the reply message. In some embodiments, the system may be configured so that the recipient list for the reply message conforms to any distribution parameter(s) specified by the replying user, yet does not include any user which was not included in the recipient list of the previously-sent message (i.e. the message being replied to).

Social network conferences may be defined on the basis of other parameters, as well. For example, participation may be defined geographically, such as limiting a conference to users within a particular locale or within a certain distance from one another.

Participation in and access to social network conferences may be controlled at varying degrees of detail. For example, different social network parameters may define different levels of participation in a conference—for instance, users meeting certain criteria may be able to view and participate in a conference, while users meeting other criteria may be limited to viewing, but not participating in, the conference. The social network (and other parameters) used as a basis in limiting participation in conferences, limiting visibility of conferences, and otherwise controlling access and activity may be defined in one or more participation policies associated with the conference. Such participation policy (or policies) may be defined to any desired degree of granularity.

At least some data exchanged amongst conference participants (such as messages or shared content) may be cached. The cached messages may be provided to one or more users who could have, but did not, participate in at least part of a conference. For example, cached data may be used to "catch up" users who temporarily leave a conference and/or otherwise join a conference already in progress. The amount and extent of cached data may be varied. For example, all of the data exchanged during the conference may be cached. Alternatively, some, but not all data may be cached. For instance, data may be cached on a user-by-user basis, whereby only data "missed" by an absent user or user(s) is cached for later use. Caching may be distributed amongst multiple computing devices, such as amongst one or more devices associated with conference participants. However, data may be cached using one or more computing devices not associated with conference participants. Parameters such as geographical location, device capability, and networking capability may be used to determine the extent and distribution of caching. Furthermore, social network parameters and other conference definition rules may be used to determine the extent, distribution, and other aspects of data caching.

A system including social network conferencing functionality can include one or more computing devices. The computing device(s) can be configured to access stored instructions that configure the device(s) to perform activities including receiving a message and message metadata from at least one sending user, where the sending user is participating in a social network conference. As noted above, the message metadata can include at least one distribution parameter and data identifying the social network conference. The instructions can also configure the computing device(s) to access social network data identifying relationships between members of the social network; to determine, based on data including the social network data and the message metadata, a recipient list for the message; and to send the message to one or more users included in the recipient list.

The system may comprise multiple computing devices, such as one or more messaging servers interfaced to one or more social network servers. In such an embodiment, for example, the messaging server(s) may receive the message and message metadata and provide the distribution parameter(s) to the social network server or servers. Based on the distribution parameter(s), the social network server(s) can generate a recipient list and provide the recipient list to the messaging server(s). The messaging server(s) can then relay the message to the appropriate conference participants.

This disclosure refers generally to "users" and "members" participating in and receiving information regarding social network conferences. The term "user" is meant to broadly include not only an individual, but also other entities, such as groups of individuals and organizations when treatable as a single unit.

BRIEF DESCRIPTION OF THE SEVERAL VIEWS OF THE DRAWINGS

A full and enabling disclosure including the best mode of practicing the appended claims and directed to one of ordinary skill in the art is set forth more particularly in the remainder of the specification. The specification makes reference to the appended figures, in which:

Use of like reference numerals in different features is intended to illustrate like or analogous components.

DETAILED DESCRIPTION OF THE PREFERRED EMBODIMENTS

Figure 1:
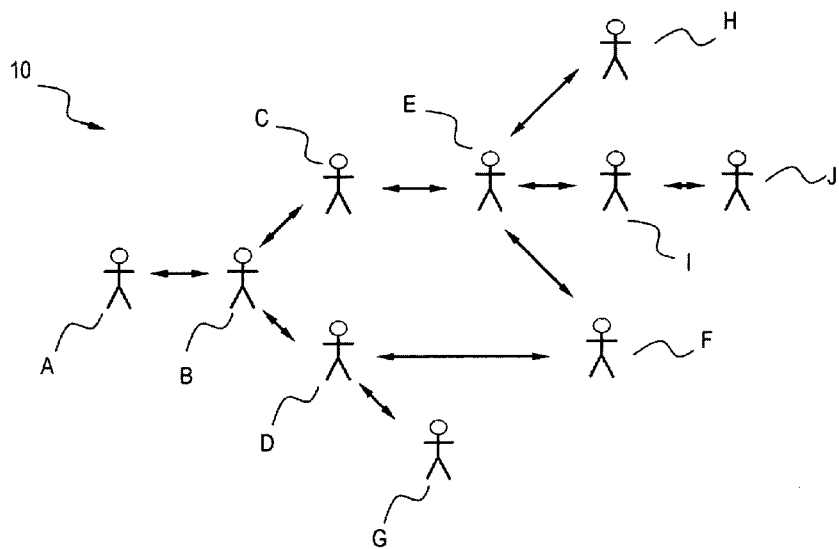
FIG. 1 is an illustration of an exemplary social network that may be used as the basis for one or more social network conferences.

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The technology discussed herein makes reference to servers, databases, software applications, and other computer-based systems, as well as actions taken and information sent to and from such systems. One of ordinary skill in the art will recognize the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel. When data is obtained or accessed between a first and second computer system or component thereof, the actual data may travel between the systems directly or indirectly. For example, if a first computer accesses a file or data from a second computer, the access may involve one or more intermediary computers, proxies, and the like. The actual file or data may move between the computers, or one computer may provide a pointer or metafile that the second computer uses to access the actual data from a computer other than the first computer, for instance.

The present disclosure also refers to the relay of communicated data over a network such as the Internet. It should be appreciated that such network communications may also occur over alternative networks such as a dial-in network, a local area network (LAN), wide area network (WAN), public switched telephone network (PSTN), the Internet, intranet or Ethernet type networks and others over any combination of hard-wired or wireless communication links.

The various computer systems discussed herein are not limited to any particular hardware architecture or configuration. Any suitable programming, scripting, or other type of language or combinations of languages may be used to implement the teachings contained herein. Embodiments of the methods and systems set forth herein may be implemented by one or more general-purpose or customized computing devices accessing software instructions rendered in a computer-readable form. Embodiments of the methods and systems set forth herein may also be implemented by hard-wired logic or other circuitry, including, but not limited to application-specific circuits. Of course, combinations of computer-executed software and hard-wired logic may be suitable, as well.

Embodiments of the methods disclosed herein may be executed by one or more suitable computing devices. Such devices may access one or more computer-readable media that embody computer-readable instructions which, when executed by at least one computer, cause the at least one computer to implement one or more embodiments of the methods disclosed herein. Furthermore, components of the presently disclosed technology, such as knowledge bases and data stores, may be implemented using one or more computer-readable media. Any suitable computer-readable medium or media may be used, including diskettes, drives, and other magnetic-based storage media, optical storage media, including disks (including CD-ROMS, DVD-ROMS, and variants thereof), flash, RAM, ROM, and other memory devices, and the like.

The present disclosure provides several examples of social network-based conferencing that involve communications via instant messaging (IM). However, one of ordinary skill in the art will understand that the principles and teachings contained herein are applicable not only to IM systems, but any other suitable network-based communication technology, including e-mail, web-based communications, short message systems (SMS) (a.k.a. "texting"), file and content sharing, audio communications including cellular and VoIP telephony, video communications, and the like.

FIG. 1 illustrates an exemplary social network 10 that may be used as the basis for one or more social network conferences. In this example, links between users A, B, C, D, E, F, G, H, I, and J are shown by double-ended arrows, although one of skill in the art will recognize that, in some situations, social network links may be unidirectional. Social network 10 represents any underlying social network structure (or subset thereof).

For example, social network 10 may represent a "static" social network representing relationships between users. For example, static social networks include friend-of-a-friend (FOAF) networks, such as those derived from cross referencing contact lists of users A through J, such as instant messaging buddy lists or contact lists. Alternatively, social network 10 may represent a static social network of users of a social networking site or service. For instance, users A through J may have designated one another as "friends" in a social networking site in the manner illustrated (i.e. A has designated B as a friend, B has designated C and D as friends, and so forth). Other links may be subject to different designations, if supported by the social network system infrastructure (i.e. D and F may be designated as brothers, I and j as co-workers, etc.). Social network 10 may be formed by merging multiple social networks together, for instance, by merging A's "friends" network from a social networking site with other social network data, such as data derived from IM buddy lists, data derived from e-commerce interactions, and/or data from multiple social network sites.

As used herein, the term "static" social network is used to differentiate such networks from "dynamic" social networks. Although "static" social networks may change over time (i.e. users add and delete friends and/or contacts), information defining "dynamic" social is derived from actual communication or other activities occurring between members of the "dynamic" social network as such communication or other activities are happening (i.e. in real time or near-real time). Social network 10 may represent a social network circuit such as those described in U.S. patent application Ser. No. 11/526, 955, entitled SYSTEMS AND METHODS FOR DISCOVERING, CREATING, USING, AND MANAGING SOCIAL NETWORK CIRCUITS, filed Sep. 26, 2006 and assigned to Qurio Holdings, Inc. application Ser. No. 11/526,955 is hereby incorporated by reference for all purposes in the present disclosure. For example, social network 10 may represent a social network circuit defined by tracking live communication links between users A through J (i.e. A is messaging B, B is messaging C and D, and so forth).

Regardless of the nature and configuration of the underlying social network, one of skill in the art will recognize that social networks may be much more extensive than social network 10. For instance, in static social networks, it is not unheard of for some users to have upwards of one hundred friends. In dynamic social networks, a full mapping of all live communications between members could comprise hundreds or thousands of users, as well. Furthermore, links between friends (or other contacts) in either type of network may be densely intertwined and overlap extensively.

Even if the view or definition of a social network is somehow limited, the resulting group of users may still be quite numerous, and may present more than a typical user wishes to handle. Users who wish to communicate with other members of one or more social networks may therefore still desire additional options for easy and effective communications, especially with regard to determining which users to contact and how to contact such users in the most effective manner.

The remainder of this disclosure discusses embodiments of systems and methods that provide additional management options for members of social networks whereby the members can define and participate in conferences, with the extent of the participation and messaging within such conferences based on the structure of the underlying social network. As was noted above, any suitable underlying social network may be used. Furthermore, in some embodiments, the underlying social network may comprise a subset of a larger social network. Furthermore, multiple social networks and/or multiple portions of social networks may be utilized in defining conferences and messaging within conferences.

Figure 2:
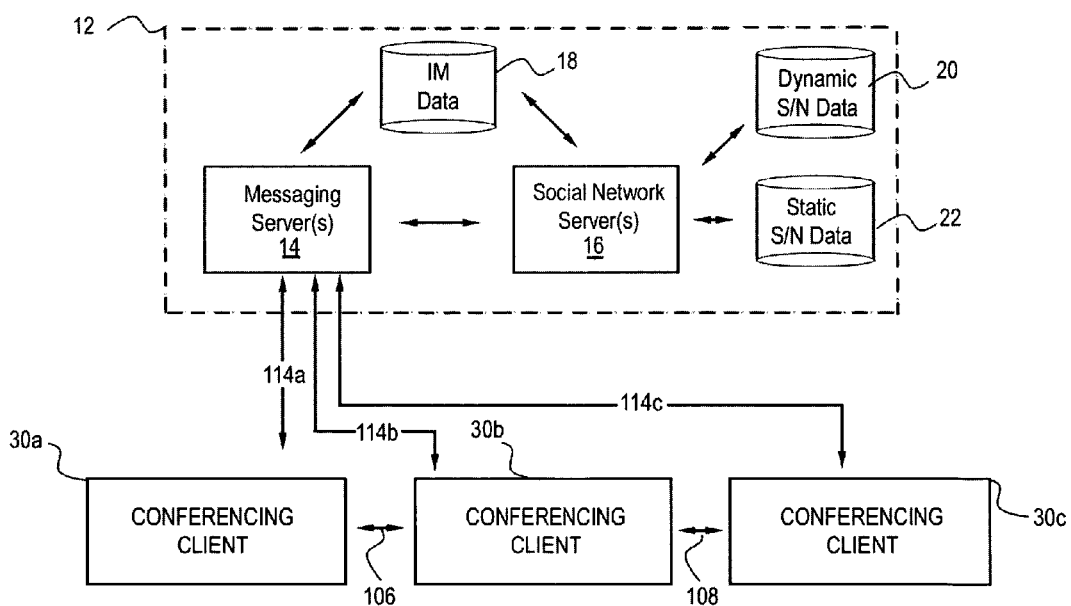
FIG. 2 is a functional block diagram of an exemplary messaging system including social network conferencing functionality.

FIG. 2 is a functional block diagram illustrating an exemplary embodiment of a system 12 that supports social network based conferencing. The embodiment of system 12 shown in FIG. 2 includes a messaging server 14 and a social network server 16. Furthermore, the system includes stores 18, 20, and 22 which maintain information about the status of various aspects of the system in one or more computer-readable forms. The servers access computer-readable instructions stored in one or more computer-readable media, and the instructions configure the servers to provide social network conferencing functionality.

FIG. 2 also illustrates several instances of a conferencing client 30, shown as conferencing clients 30a, 30b, and 30c. Each conferencing client 30 comprises one or more computing devices each accessing instructions that configure client 30 to provide messaging functionality, interact with one or more users of the device, and interface with one or more computing devices comprising social network conferencing system 12. The functionality of each client 30 may be provided by one or more applications, processes, modules, components, or other software routines. For example, a client 30 may comprise a computing device running a messaging application or applications, with social network functionality provided by one or more software modules or components, such as plug-ins. Alternatively, a client 30 may comprise a computing device running an application that provides messaging and social network functionality. In additional embodiments, all or part of conferencing client functionality may be provided by one or more network-based applications or processes running on computing devices interfaced to each client computing device. For example, messaging and/or social network functionality may be provided through web-based applications, with client 30 providing the user interface (i.e. rendering web page displays and/or running client-side applications, scripts, and the like).

In FIG. 2, each client 30a, 30b, and 30c interfaces with messaging server via respective links 114a, 114b, and 114c, although, as will be noted below, each client may additionally or alternatively maintain links to other resources comprising system 12. Furthermore, links 106 and 108 between the clients are also shown; however, in some embodiments, such links are not used for messaging, as will also be addressed later in this disclosure.

As noted above, one or more software applications running on each client 30 provide messaging functionality. For example, clients 30a, 30b, and 30c may each interact with messaging server 14 over respective links 114a, 114b, and 114c to log into the messaging system and obtain status information. Users of clients 30a, 30b, and 30c may then send messages, such as instant messages, to one another via server 14 using links 114 and/or by direct links such as 106 and 108. Depending upon the messaging architecture, all, some, or no messages may be routed by server 14 (or other intermediate devices) and all, some, or no messages may travel directly between clients. Server 14 may maintain IM status and other data in store 18, including data identifying various IM users, such as user IDs. For example, when a client 30 becomes active and sends a message, server 14 may track such activity in one or more databases in store 18.

In this example, the clients 30a, 30b, and 30c are shown as connected to the same messaging server. However, in other embodiments, at least some of the clients may each interface with multiple messaging servers. Furthermore, in other embodiments, multiple messaging servers may be involved, with at least some clients interfacing with different messaging servers than at least some other clients. As was noted earlier, although the term "messaging" is used, communications may comprise any suitable form. For instance, clients participating via video chat may interface with one or more servers supporting video chat, while clients participating via audio chat interface to one or more servers supporting audio chat, while still further clients participating via text messaging interface to one or more text messaging servers. The servers may all interface (directly or indirectly) with social network server 16.

Clients 30 may also be in communication with social network server 16. Social network server 16 may interact with users of clients 30a, 30b, and 30c to define social network relationships and preferences. For example, social network server 16 may provide a web-based interface for users to define friends, upload and edit contact lists, and view and maintain social network profile web pages. Alternatively or additionally to the web-based application, social network server 16 may interact with one or more instances of a social network client application or process running on clients 30. The client application may be used for the user to define social network relationships and preferences, as well as conference formation, participation, message filtering, and other parameters and preferences.

Social network server 16 stores data defining one or more social networks, social network member data, and other social network data in one or more stores 22. For example, store 22 may comprise one or more databases identifying, social network users, characteristics for each user (profile information, etc.), relationships between each user, and privacy, informational, and system parameter settings for each user. Information stored in such database(s) could be used by server 16 and/or clients 30 to construct diagrams such as the illustration of social network 10 in FIG. 1. Social network data may be used, for instance, to determine the extent of social network groups (such as grouping members by common interest, age or other demographic information, etc.), and to calculate data about social network users and the networks themselves, such as determining degrees of separation between users.

In some embodiments, social network server 16, messaging server 14, and/or other computing devices support social network circuit functionality. For instance, one or more software applications or components running on clients 30 may be configurable to provide session data identifying live communication links between clients. Social network server 16, for instance, may then track which members of one or more social networks are participating in social network circuits and store information regarding such circuits in one or more databases in store 20. Session information may be obtained from messaging server 14, as well. Store 20 may further comprise information used to control participation and/or information about the circuits by various parameters. Store 20 may further comprise data regarding other instances of dynamic social network activity. Of course, in some embodiments, data regarding underlying social networks (whether static or dynamic) may be maintained in more or fewer stores than are shown in the example of FIG. 2.

In embodiments of the presently-disclosed technology, clients 30 support transmitting metadata to social network conferencing system 12 to define one or more social network conferences and to specify the extent to which a message should be transmitted in a social network conference. For example, each user of clients 30 may receive information about the user's respective social networks from system 12, such as a diagram or chart of the social network rendered by client 30. After reviewing the information, interested users may provide one or more social network parameters to system 12 defining participation in one or more social network conferences. Servers such as messaging server 14 and social network server 16 are configured to share knowledge regarding messaging and social network functions. For example, the servers may have access to one or more common data stores; in FIG. 2, both messaging server 14 and social network server 16 have access to IM data store 18. Alternatively, data identifying message and social network participants (such as user IDs) may be identical or mapped between the two systems to allow for easier cross-referencing of messaging and social network activity.

For example, assume that users A, B, and C of social network 10 are using clients 30a, 30b, and 30c, respectively. User A wishes to initiate a discussion within the social network, but only amongst users that user A considers to be close friends. Accordingly, using client 30a, user A may specify one or more parameters to initiate a social network conference. The parameter(s) could, for example, include a degree of separation for inclusion in a conference. If user A specifies a degree of separation of "two," for example, relative to himself, the conference that is ultimately created can include users A, B, C, and D. As another example, user A could specify users within a single degree of separation from user E; in that case, the conference could include user A (the initiator) and users E, C, H, I, and F.

User A specifies one or more distribution parameters by interacting with a user interface rendered by client 30a, and the parameter(s) are packaged into conference metadata by conferencing client 30a. The conference metadata may include other information, as well. For example, user A may specify parameters that span multiple social networks, in which case the conference metadata would specify all such social networks. In one embodiment, the conference metadata is sent to messaging server 14 using link 114a. Messaging server 14 is configured to recognize the conference metadata and provide data identifying the social network in question and the distribution parameters to social network server 16. Social network server 16 then uses the distribution parameters and other information to assemble a participant list for potential inclusion in the social network conference. Data defining the social network conference, including the participant list, is then stored in computer-readable form. For example, data defining social network conferences may be maintained in one or more additional databases accessible by social network conferencing system 12.

A similar process is entailed when a conference participant sends a message to one or more users in the conference. Resuming the example from above, once the conference is established and includes users A, B, C, and D, assume user A wishes to send a message. User A may send the message to the entire conference, or may further limit the message by specifying additional parameters. As a first example, assume A wishes to send a message to everyone in the conference. User A types the message, and specifies the distribution. One of skill in the art will recognize that the distribution parameter(s) may be defined in any suitable fashion; in this example, A may select "full distribution," or A's system may be configured to distribute the message to all users unless a more limited distribution is specified.

In any event, conferencing client 30a sends message metadata along with A's message to server 14. Server 14 accesses the message metadata and provides data to social network server 16. In this example, the metadata identifies the conference to server 16, which accesses the participant list. Since in this example, user A has put no further limits on the distribution of the message, server 16 then provides the full participant list to server 14. Server 14 then relays A's message to conferencing clients associated with each of B, C, and D.

As a second example, user A may wish to send the message to a more restricted group within the conference. For example, user A may wish to begin a side discussion with only the closest of contacts. Accordingly, user A may specify that the message is to be distributed only to members within one degree of separation. The one-degree parameter is included in the message metadata and relayed to server 16 by server 14. Server 16 determines the participants in the conference that meet the criterion; in this case, user B is the only member of the social network underlying the conference who is in within one degree of separation from user A. Therefore, the recipient list provided to messaging server 14 includes only user B. Messaging server 14 relays user A's message to user B, but not to users C or D.

Conferencing system 12 may relay all or some metadata associated with each message to recipient clients. For example, as detailed below, in some embodiments, clients 30 support threaded displays of conference messages. Such displays may be based upon metadata associated with each message. Conference metadata specifying participation, conference designation, duration, and the like may also be provided to clients 30. Conferencing system 12 may also be configured to respond to queries from clients 30 for conference and message metadata. Message data, message metadata, conference metadata, and other information transmitted to and from clients and within conferencing system 12 may be subject to any suitable encryption or other security schemes, such as communication over secured channels.

Message metadata may also be used for filtering messages. For example, a user may provide one or more parameters specifying messages to filter out and/or to prioritize. For example, the user may wish to only see messages from only those users within a certain degree of separation. The user may specify such preferences via client 30. The messages may be filtered at the server side and/or at the client side. For example, in some embodiments, the conferencing system may be configured to remove a user from recipient lists based on the user's filtering preferences. In other embodiments, messages may be sent out to all users in a recipient list, but the client device(s) associated with each user may display messages differently based on filtering parameters.

One of skill in the art will appreciate the numerous possible configurations with regard to message and conference management are possible. For example, the system may provide that, when a user replies to a particular message, the distribution of any such reply will follow the same distribution rules as the original message unless changed by the message author. In such embodiments, system 12 is configured to track not only participation in each conference, but the distribution of each message. For example, each message may be associated with a unique identifier that is cross-referenced to a particular distribution list and conference. Taking the first example from above, assume user B replies to user A's message to users B, C, and D. Unless user B changes the distribution, user B's reply will be directed to users A, C, and D.

This functionality may be achieved in a variety of ways. For example, using client 30b, user B enters a reply to A's message. Client 30b sends the message along with related message metadata identifying the conference and additional data indicating that the message is a reply to user A's message. Upon receipt by conferencing system 12, the system may recognize that the message is associated with a presently-existing conference and is a reply to another message. Since the message metadata does not include any further limits on distribution, social network server 16 uses the same recipient list as for the original message (substituting user A in B's place in the recipient list).

However, C may wish to limit the distribution of a reply to a message. For example, C may wish to make an humorous remark or criticism that will only be appreciated (in user C's view) by close friends. Accordingly, user C may limit distribution of the reply to users within one degree of separation. C's limitation will be included with message metadata associated with user C's reply message and sent to conferencing system 12. Social network server 16 will determine which participants in the present conference meet user C's criteria. Furthermore, in some embodiments, the maximum possible extent of distribution for a reply message will include only those users who received the original message. For instance, social network server 16 may access data including the participant list for the original message (i.e. A, B, C, and D). In this example, the only user in the present conference who received the original message and who is within one degree of separation from user C is user B. Therefore, social network server 16 will direct messaging server 14 to distribute C's reply only to user B, but not to users A or D. Continuing with the above example, if C's reply is only distributed to user B, in some embodiments, any further reply to the reply message cannot be sent to any users other than C.

Alternatively, the system may allow for the message to be distributed more broadly subject to approval by one or more additional users. For example, a reply may be sent to a broader set of users subject to approval by the party who sent the original message and/or other parties included in the sub-conference. As an example, assume that, in a conference including users E, C, H, I, and F, user E sends a message to all conference participants. User H begins a side discussion with users I and F. Ordinarily, user F may only direct a reply to H's side discussion message to users H and I. However, the conferencing system may allow user F to obtain permission from user H to distribute user F's reply message more widely. Of course, user F could instead simply send a new message, rather than a reply message.

Users may specify any number or combination of rules, preferences, and parameters in defining the extent of conference participation, distribution of messages, and distribution of replies to messages. As was noted in the examples above, a user may specify distribution based on degrees of separation. The degree of separation may be relative to the distributing user; however, the distributing user may specify a degree of separation relative to another user. Other parameters may include user parameters, such as user identity, membership in a group, interests, demographic characteristics, and the like. Still further parameters could be based on user activity. For example, a user may wish to limit conferencing (or messages) to users engaged in particular activities, such as only those users participating in content sharing. The parameter(s) could further depend upon the particulars of such activities, such as only those users who have viewed or shared certain content. Additional parameters may include characterizations between users included in social network data. For example, a social network may define various classifications of user relationships, such as "friend," "co-worker," "family," etc. A user may limit conferencing (or message distribution) based on such classifications. Additional parameters may include geographical parameters. For example, user devices and/or the conferencing system may support location-based services such that the location of particular users can be determined. Based on the user location data, conference participation can be determined based on geographical parameters, such as users within a certain distance, users from a particular location, and so on.

Parameters may also be applied across multiple social networks. For example, a particular user may be a member of a "work" social network and a "friend" social network. The user may provide for conferencing only within one of the social networks. Alternatively, the user may specify rules applicable to either or both networks. For instance, the user may wish to conference with users within two degrees of separation in the "friend" network and only within a single degree of separation in the "work" network.

Users may also define parameters that control conference participation to a finer degree and/or visibility of the conference and participants therein. For example, a participation policy may be defined whereby users have different access levels, with the participation policy included with conference metadata, message metadata, or otherwise provided to the conferencing system and associated with the conference. The access levels may provide for some users to moderate and fully participate in the conference. Other users may be allowed to participate but not moderate. Still other users may be allowed to participate, but in a limited extent—for example, the users may be able to view the conference, but not to send messages to the conference, or to only send messages to designated users (such as a moderator or moderators). The access levels may be defined based on any parameters discussed herein, either alone or in combination. For instance, in a particular conference, users within 2 degrees of separation from a moderator may be allowed to fully participate, users within four degrees of separation may be allowed to view the conference but not participate, while users beyond four degrees of separation may be unable to view the conference at all. A participation policy or participation policies may be provided to any desired degree of granularity. For instance, a participation policy may specify participation, visibility, and other parameters at the conference level, thread/discussion level, and/or even on a message-by-message basis.

Conferencing system 12 may support multiple conference formation options. For example, as noted above, one or more users can specify one or more rules or parameters defining participation in a conference by way of client 30. Client 30 then sends the conference metadata to the conferencing system 12. The conference metadata may simply comprise message metadata sent with an origination message. However, for an origination message, the message metadata indicates that a new conference is to be created.

Although several examples herein use text-based messaging such as IM communications, the term "message" is not meant to be limiting. Rather, the conferencing system may support other modes of communication for some or all of the conference participants, including audio and/or video. For example, a conference may comprise users participating by way of VoIP connections and/or users communicating via video chat. Of course, a single user may participate via multiple communications modes—for example, the user may participate in video chat while also typing messages. In some embodiments, message and/or conference metadata may be sent independently of the actual conferencing content (i.e. the substantive messages, audio stream, video stream, and/or other shared data).

System 12 may also support other conference formation parameters. For example, system 12 may support automatic conference formation and/or suggest conference formation based on user preferences and past activity. For example, the system may be configurable to automatically convert a plurality of IM communication sessions (or other type(s) of communication sessions) into a conference, or to make a recommendation to do so.

Other user activity parameters may be specified as well. For example, a user may provide for formation of conferences based on content metadata—for instance, a user may provide for the system to automatically form a conference including all users currently listening to the same song, music by the same artist, music of the same genre, etc. Other conferences may be formed based on network activity, such as sharing content of a particular data type (photos, movies, etc.) and/or content having similar metadata (sharing of particular music, songs, movies, etc.). Of course, the activity parameter(s) may be combined with one another and/or the social network parameters. As an example, a user may provide for a conference to be formed when at least three users within two degrees of separation are listening to music performed by a specified artist.

System 12 may support such functionality in a number of ways. Social network server 16 may be configured to analyze data describing current messaging sessions or other activity, such as social network circuit activity, and periodically compare such data to conference formation parameters provided by one or more users. The activity data may be obtained from any suitable source, such as message session data from messaging server 14. The activity data may also be based on other activity, such as tracking of social network circuits or subdivisions thereof. For example, a user may indicate that the user wishes to automatically create a new conference any time the user is involved in a subset of a social network circuit related to a game when the subset includes three or more people. Social network server 16 can access circuit data and automatically form a conference including such users. Alternatively, social network conferencing system 12 can notify the user(s) and recommend creation of a conference.

FIG. 2 illustrates a single messaging server 14. However, one of skill in the art will recognize that messaging functionality may be provided by more servers and/or in a distributed environment. For example, messaging server functionality may be distributed to a plurality of servers within a single system. Alternatively, multiple messaging servers may correspond to multiple messaging systems. For instance, users of clients 30*a* and 30*b* may use a first messaging platform (such as Yahoo! messenger), while the user of client 30*c* uses a second messaging service (such as Google chat). Cross-messaging-platform conferences could be achieved by properly cross-referencing users to the appropriate platform. Server 16 can be configured to assemble a recipient list and then send portions of the recipient list to the appropriate messaging server. The conferencing system can also provide for the messaging content to be relayed between the messaging servers corresponding to the disparate messaging platforms, as well, such as via messages sent between the servers themselves or through one or more intermediary devices providing cross-platform connections.

As a further alternative, messaging functionality may be distributed to the various clients. For example, if clients 30*a*, 30*b*, and 30*c* are using a peer-to-peer messaging platform, no central server may be involved. Instead, each client 30 sends the message metadata to social network server(s) 16, which return the distribution list. Then, each client 30 distributes the message accordingly. Embodiments using client-based message distribution could also support cross-platform messaging provided the social network conferencing application is properly integrated with messaging tools for the disparate platforms.

Although FIG. 2 illustrates a single social network server 16, in some embodiments multiple social network servers may be involved. For example, if conferences occur based on data from multiple social network services, one or more servers corresponding to each service may be accessed. Each service may have its own related stores of static and/or dynamic social network data. In embodiments involving multiple social network services, a separate conferencing server may be utilized to coordinate the conference by consulting social network servers for each social network or the various social network servers may be configured to provide conferencing functionality in a coordinated fashion.

Figure 3:
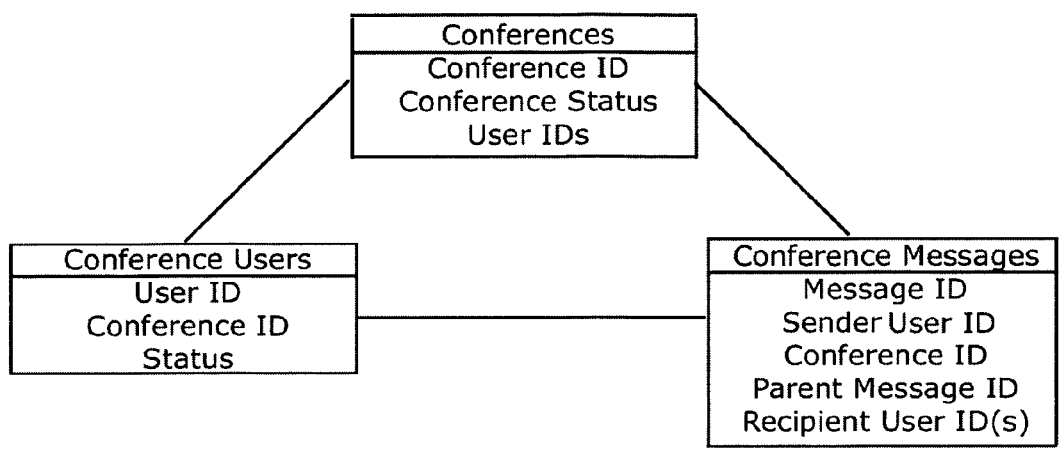
FIG. 3 illustrates a plurality of exemplary data structures suitable for use in defining and tracking social network conferences.

As was noted above, conferencing system 12 may store data defining social network conferences in any suitable fashion and location(s). For example, social network conferences may be defined using a plurality of data structures such as are illustrated in FIG. 3. Conferences may be defined by a database record including a conference ID and list of users by user ID. Conference activity may be cross-referenced between database records—for instance, a record may be included for each user indicating the status of each user with regard to one or more conferences by conference ID. For example, status indicators may include "active," "invited but inactive," and "invited but declined."

Each message may be tracked by a record including a unique message ID and cross-reference to a conference ID. Furthermore, the message record may include a list of recipients by user ID or other data indicating recipients, such as a cross-reference to other records. For instance, the message record may also include one or more cross-references to other message records. For example, a reply message can include a cross reference to one or more message IDs the message is in reply to.

An additional feature that may be supported by social network conferencing system 12 is message caching. As noted above, as a conference takes place, the system may log conference participants and message distribution. However, the system may further maintain a copy of all or some message content. Messages may be cached based on system parameters and user preferences. For example, the system may be configured to cache a particular user's messages until that user leaves the conference. Furthermore, the system may maintain messages subject to a system-wide time limit. Users may also provide archiving and privacy preferences, on global level and/or on a conference-by-conference or message-by-message basis. For instance, a user may specify that, by default, the user's messages are cached for thirty minutes, but may designate certain conference participation as not to be cached. Shared content may also be cached for later use by conference participants. Cached messages and/or shared content may, for example, be associated with particular conference IDs and/or message IDs for access and retrieval purposes.

The cached messages may be used to "catch up" a user who joins a conference already in progress. For example, assume that user A wishes to initiate a conference with all users of social network 10 within two degrees of separation (i.e. B, C, and D), but user D is offline. The conference would therefore begin with users A, B, and C. However, if user D later comes online, user D may be presented with the option of joining the conference. In embodiments supporting message caching, user D may be presented with some or all of the previously-exchanged messages as stored in the system cache.

In some embodiments, the system may support one or more advanced caching options. One such option is "smart caching," whereby the system caches some, but not all data, with the decision as to whether to cache data based at least in part on which user(s) the caching is to benefit. As noted previously, users in a conference may receive some messages and/or content, but other messages/content in the conference are not intended to reach that particular user. In one embodiment of smart caching, only the content that is accessible by that particular user is cached. The caching may be dependent on whether the user is online or offline, but alternatively may proceed regardless of online/offline status. Returning to the example of the A, B, C conference that is later joined by user D, the system may be configured to cache only the messages that user D would have received during the part of the conference that occurred before D joined. Such messages (and other data) could then be used in catching-up D when he joins the conference. Other messages (i.e. messages received by at least one of A, B, and C) could be cached on a different basis, or may not be cached at all.

As was noted above, caching may occur for the duration of a conference or, alternatively, may be triggered by the participation status of one or more users in a conference. For example, if a user is offline for a portion of a conference, some or all of the conference messages (and/or other data) may be cached to catch up that user. However, other status changes may trigger caching activity. For example, users may participate in a conference using one or more computing devices supporting location-based services. Such devices may include cellular telephones or other devices with GPS capability. Location of users may be determined using other data, as well, such as IP (or other network address) tracing, wireless signal triangulation, or other methodologies.

The location of a particular user may therefore be used to provide conferencing functionality, including triggering or altering caching. For example, a user with a mobile device may go in and out of range for adequate connectivity to the conference, such as when the user approaches (or crosses) the edge of a wireless network coverage area. The conferencing system may be configured to begin caching activity on behalf of that user based on determining, based on the location data, that the user is in a spotty coverage area. Furthermore, the system may include processes and routines to determine which data is available to the user and which data needs to be provided from the cache. When the user returns to an area of adequate connectivity, the appropriate data can then be provided to the user.

Another aspect of smart caching addresses where the cached data is stored. For example, in some embodiments, cached conference data (messages, shared content, etc.) is stored at one or more servers (or server nodes) supporting the conferencing system. However, in alternative embodiments, some or all of the data cache could be distributed amongst other computing devices. For example, portions of the cache could be distributed amongst devices associated with the conference participants. Another aspect of the cache distribution relates to the physical distribution of data. For instance, portions of the cache could be allocated to devices based on geographical data associated with each device.

Alternatively or additionally, portions of the cache associated with a first conference could be distributed to devices associated with one or more users not participating in the first conference. As an example, the cache for the A, B, C, conference could be configured to cache only content receivable by user D. Assuming users A and B are closer to D than user C, then based on geographical data, the cache could be distributed to users A and B. Physical distribution of the cache could also depend at least in part on other parameters, such as device resources, network connectivity, and social network considerations (trust, relationship type, degree of separation, etc.). For example, if users A and B are participating via mobile devices, while user C is using a personal computer, the cache may be distributed to user C based on greater storage and connectivity capabilities of C's computer as compared to A and B's respective mobile devices.

Figure 4:
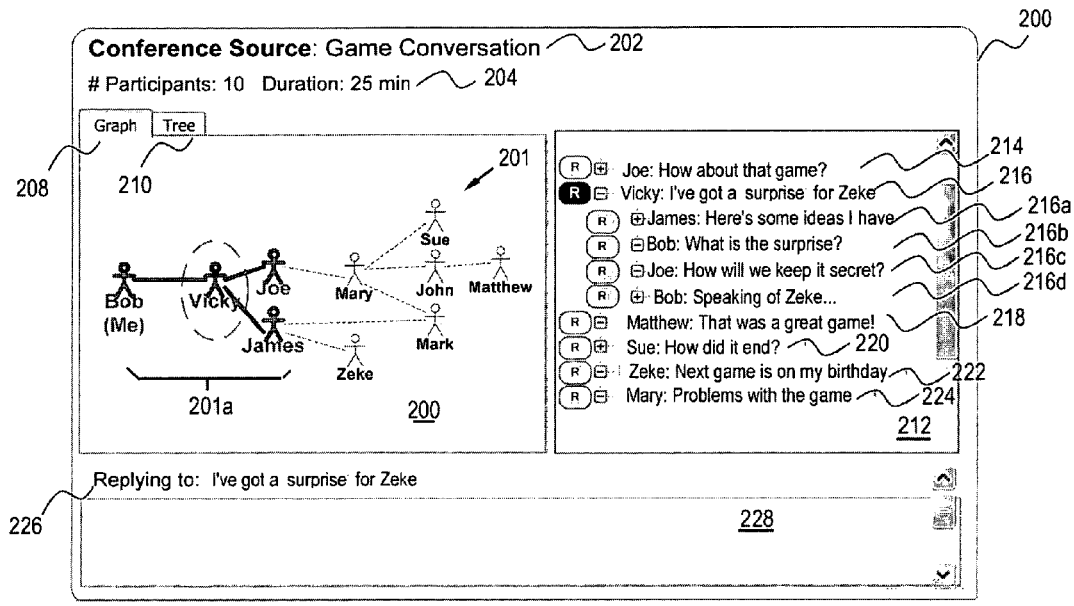
FIG. 4 illustrates an exemplary user interface which may be rendered by a client device to provide for user interaction in social network based conferencing systems.

FIG. 4 illustrates an exemplary user interface which may be used by one or more users participating in social network conferences. In this example, window 200 is rendered by conferencing client 30 based on data including data sent to and from social network conferencing system 12. Window 200 includes several different areas and data indicators. Title bar 202 provides a description of the presently-selected conference ("Game Conversation"), while area 204 includes conference metadata (in this example, the number of participants and duration of the conference). Display area comprises a portion of the window comprising a display of social network conference group 201 comprising Bob, Vicky, James, Joe, Mary, Zeke, Sue, John, Matthew, and Mark. In this example, social network conference group 201 is illustrated as a diagram. However, any other display mode or type is suitable, including graphs, trees, and other depictions of participants and social network relationships between the participants. Window 200 further includes two selection tabs 208 and 210 which allow the user to alternate between display modes. Additionally, further tabs (or other graphical selection mechanisms) may be provided for users to switch between multiple conferences. Alternatively, of course, each conference could have its own separate window.

Window 200 further includes conference thread display area 212. Based on information received from social network conferencing system 12, thread display area 212 includes a plurality of threads (214, 216, 218, 220, 222, 224), each thread comprising data (messages, content, etc.) exchanged amongst the members of conference 201. Several of the threads are displayed as expandable trees such that the user may select a thread and see one or more replies and sub-threads. For example, thread 214 may comprise a set of messages and replies sent to the entire conference group 201 initiated by Joe. Message 218 has been sent to the group by Matthew, but as yet has no replies. Thread 220 has been initiated with a message by Sue, and the display indicates that there are replies, while messages 222 and 224 are from Zeke and Mary, respectively, but as yet have no replies.

Some messages and/or threads may be publicly available, while others are subject to more limited distribution. For instance, thread 214 may be visible to the whole group, while all or some of threads 216, 218, 220, 222, and 224 are visible only to certain members of the group. Of course, in this example, the Figure shows messages and threads visible to Bob.

Each message or thread text may include an indicator of which participant sent the message. Alternatively or additionally, display of a message or thread may be synchronized to the graph (or other view) of the sending party. For example if thread 214 was initiated by user "Joe," selection of the initial message in thread 214 can result in user Joe's icon being highlighted or otherwise altered. Joe's icon may be highlighted or animated, for instance, when thread 214 is first sent to the group, as well, to function as an activity or new message indicator. Other feedback, such as sounds, may be associated with particular conference users, events, and so forth. Messages from different users and/or having different distributions may be rendered in different colors, fonts, etc.

As was noted above, a user's view of conferences may include messages and/or threads sent to the entire conference and some messages or threads of more limited distribution. For example, assume thread 216 was initiated by user Vicky, with a message sent to some, but not all, members of conference group 201. Instead, assume user Vicky sent the message only to Bob, Joe, and James to form sub-group 201a within conference group 201 to make plans for Zeke's birthday. To reply to the entire thread 216, user Bob may select thread 216 (thereby highlighting himself, Vicky, Bob, Joe, and James) and/or select the reply option (shown as "R" in FIG. 4). Upon selection of the reply option, Bob may be presented with distribution options. For instance, he may select particular users in the graphical display of the conference. Alternatively, Bob may be presented with a screen to select one or more social network parameters governing distribution of his reply, such as degree of separation, group membership, etc.

In some embodiments, software running at the conferencing client and/or one or more conferencing system servers may be configured to parse text provided by users to determine distribution parameters. Accordingly, Bob may be able to specify distribution inline with the text of his message. Text parsing and analysis could be achieved using any suitable algorithms, processes, or other tools known to one of skill in the art, such as expert systems.

Thread 216 comprises both threaded and unthreaded messages 216a, 216b, 216c, and 216d, and in this example are rendered as items in the expandable tree of message 216. In this example, messages 216a and 216d comprise initial messages in sub-threads, which may or may not have more limited distribution even within sub-group 201. For example, message 216a may have been sent by user James only to users Vicky, Bob, and Joe, while message 216d may have been sent by user Bob only to users Joe and James. Selection of each thread could result in additional or different effects, for instance, additional highlighting or animation identifying each the messages as part of the message 216 thread but indicating the more restricted distributions. Messages 216b and 216c, on the other hand, comprise messages for which no sub-thread has been initiated (alternatively, either or both messages 216b and/or 216c may comprise initiated sub-threads, but the sub-threads may not be visible to user Bob).

FIG. 4 further illustrates text entry area 228 and entry indicator 226. Text entry area 228 echoes text (or other input) provided by a user, while entry indicator 226 indicates which prior message (if any) the input will be associated with. Entry indicator may also indicate or briefly summarize the distribution parameters associated with the message. For example, a user may select thread 216 to compose a reply message, but specify further distribution parameters. Destination indicator 226 would then specify the thread but with an annotation of the changes in distribution. Alternatively or additionally, the graphical depictions of the users that are to receive the reply may be highlighted or otherwise altered to indicate which users will receive (or will not receive), the message. For example, if user Bob replies only to user James in response to the initial message of thread 216, the icons for users Vicky and Joe may be ghosted out or an "X" (or other indicator of non-receipt) may be superimposed over icons for Vicky and Joe, while the icon for user James is highlighted, circled, or enlarged. Bob's reply would appear as a sub-thread under thread 216.

Figure 5:
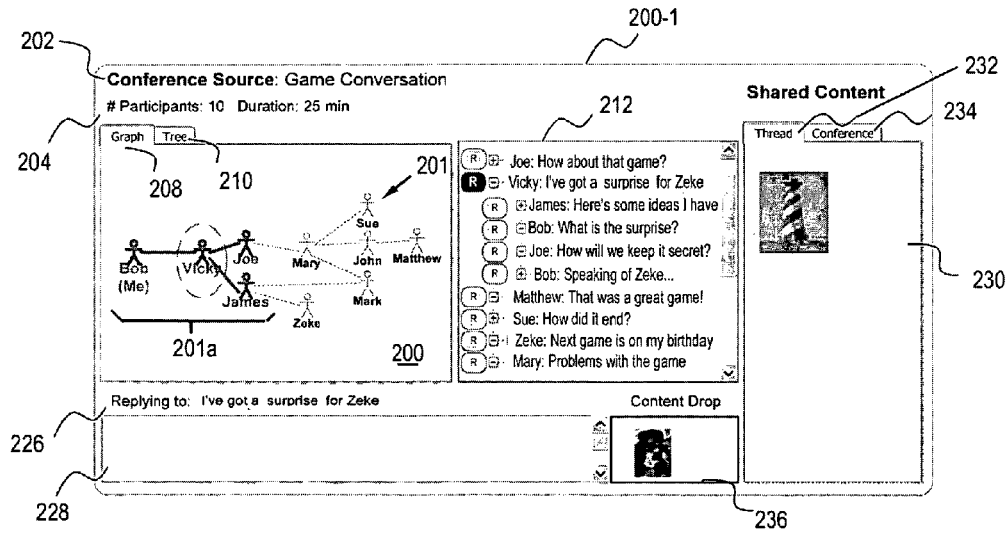
FIG. 5 illustrates another exemplary user interface which may be rendered by a client device to provide for user interaction in social network based conferencing systems.

FIG. 5 illustrates an alternative window 200-1, which includes the same features as window 200 of FIG. 4. However, window 200-1 further displays information related to content sharing functionality implemented alongside (or as part of) social network conferencing system 12. For example, shared content area 230 includes icons or other indicators of content that is presently being shared amongst conference participants. Software running on client 30 may be further adapted to access shared content based on a user's clicking in area 230 (or other user input). In this example, tabs 232 and 234 allow a user to sort through content that is presently available to participants in certain threads or to the conference as a whole. FIG. 5 also illustrates content drop area 236 alongside text entry area 228. Content drop area 236 may be configured to provide drag-and-drop functionality whereby a user can drag content to be shared into drop area 236. Client 30 can then share the content with some or all participants of a social network conference. In this example, message 216 is highlighted, and so any content files that are shared would be shared with the participants in thread 216 (i.e. group 201a).

The underlying content sharing system may take any suitable form, and as noted above may comprise one or more separate content sharing systems and/or or one or more systems partially or wholly integrated into social network conferencing system 12.

For example, a social network (and/or social network circuit) may comprise users of a content sharing system. Social network conferencing functionality may be implemented as a module (or other component) of the content sharing system, with the messaging functionality integrated into content sharing user application(s). Messaging and social network server functionality could be provided by the content sharing system directly, or the social network and messaging services could be provided by one (or more) separate providers.

For example, if the content sharing system is separate from the conferencing system, one or more components of the conferencing system could be configured to interoperate with appropriate components of the content sharing system(s) utilized. For instance, the conferencing client could be configured to interface with one or more content sharing client applications to send and access shared files, such as by passing file identifiers associated with content in the drop area 236, with the particulars of obtaining the content file(s) handled by the content sharing client application(s). Of course, for content sharing system(s) that utilize server-based distribution, the conferencing client(s) could interface with such servers directly or indirectly.

Social network conferencing system 12 may also support filtering of messages and conferences based on social network parameters. For example, a user participating in a large social network conference may specify that messages from users beyond a specified degree of separation are hidden. Alternatively, certain messages may be given priority over others—the user may specify that messages from closely-related users are more prominently displayed than those from distantly-related users. Similarly, the user may specify viewing preferences for entire conferences based on similar parameters.

Figure 6A:
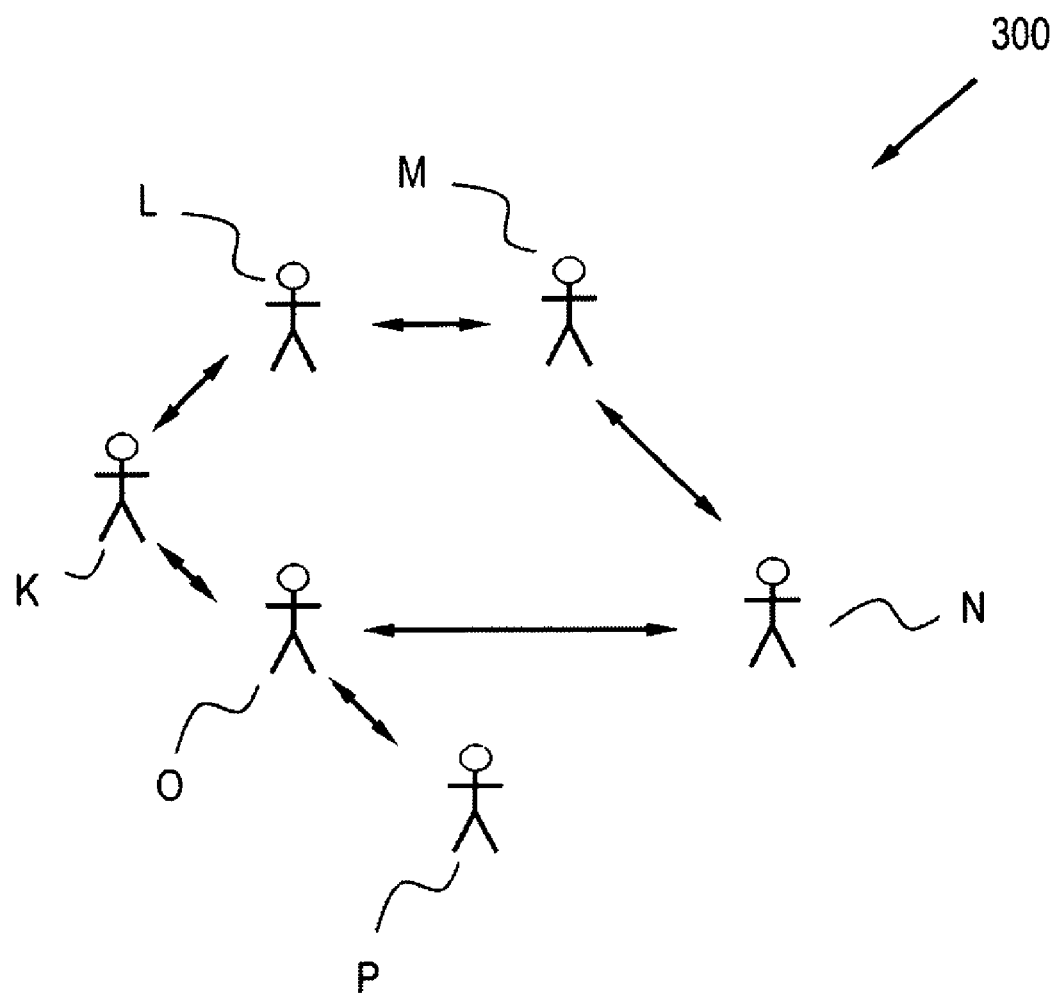
FIG. 6A illustrates another exemplary social network.

Aspects of the presently-disclosed technology will now be discussed in conjunction with the exemplary social network 300 shown in FIG. 6A and an embodiment of a social network based conferencing system 312 illustrated in FIG. 6B. Social network 300 includes users K, L, M, N, O, and P, who share various social network connections indicated by the arrows between various users. In this example, each user is engaged in content sharing with at least one other user in the social network. Accordingly, social network 300 may comprise a social network circuit, although recognition of the existence or extent of a social network circuit is not critical in this example.

Figure 6B:
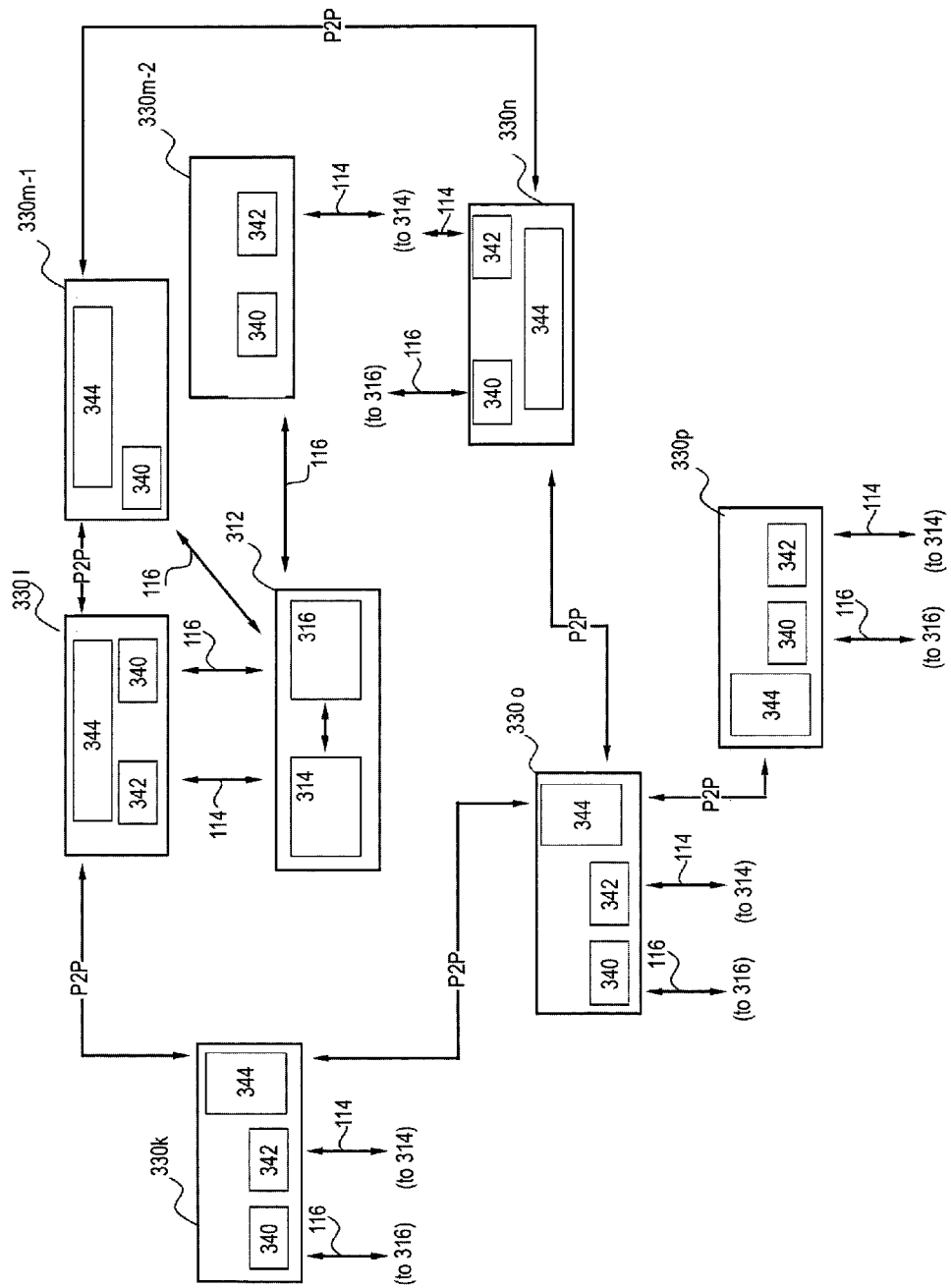
FIG. 6B illustrates a functional block diagram of another exemplary system including social network conferencing functionality.

FIG. 6B illustrates a plurality of networked computing devices. Each user K through P is associated with one or more social network conferencing system clients 330: user K uses computing device 330k, user L uses computing device 330l, user N uses computing device 330n, user O uses computing device 330o, and user P uses computing device 330p, which may all comprise desktop, laptop, tablet, or other personal computers. User M in this example is using two computing devices, 330m-1 and 330m-2. Both computing devices 330m-1 and 330m-2 are in communication with social network conference system 312 and provide aspects of social network conferencing client functionality for user M. In this example, device 330m-1 may comprise a laptop computer, while device 330m-2 comprises a cellular telephone.

Social network conference system 312 may comprise one or more social network servers 316 and one or more messaging servers 314. As was noted previously, the social network server(s) and messaging server(s) have access to various data stores including data defining social networks, user preferences, messaging status, and the like, but such stores are not illustrated in this example for purposes of clarity.

Users K through P are engaged in various P2P file sharing sessions, with each user running one or more instances of P2P client application 344. Additionally, each user is running a messaging client application 342. For user M, device 330m-1 is used to execute an instance of P2P application 344 while device 330m-2 runs an instance of messaging client application 342.

Each of the computing devices also executes one or more instances of social networking client application 340. Application 340 may be configured to provide session data indicating the state of communication sessions utilized by each user. For example, the instance of application 340 running on machine 330k may provide data regarding the K-L and K-O P2P sessions, the instance of application 340 running on device 330m-1 reports the M-I and M-N sessions, while the instance of application 340 may provide information about activity in progress using device 330m-2, and so forth.

As one of skill in the art will note, each application may be configured and optimized for the particular platform on which the application runs. Furthermore, application 340 may comprise a component or module configured to operate in conjunction with other applications. For example, functionality provided social network client application 340 may be provided as a component in a more extensive social networking application that allows users to define, view, and manage relationships in a social network. Application 340 may function as a module, plug-in, or other component in messaging application 342 or vice-versa. Applications 340 and 342 may together allow users to provide messages and social network conference parameter inputs via any suitable user interface(s), such as those illustrated in FIGS. 4-5.

In this example, each instance of messaging application 342 is in communication with one or more messaging servers 314 via a link 114, each instance of social networking application 340 is in communication with one or more social networking servers 316 via a link 116, and each instance of P2P client application is in communication with one or more other clients, but no central server. One of skill in the art will realize that the extent of client-server connections may vary, and server functionality for any or all of the applications may be partially or wholly distributed. For example, in some embodiments, messaging application 342 may be able to connect to other messaging clients without the need to pass the messages through a central server. Some embodiments may utilize P2P applications that connect to one or more central servers. Similarly, social network client application may use distributed server functionality amongst social network peers, rather than connecting to a central server.

In this example, social networking client application 340 provides session data to social networking server 316, which may use such data to, for example, define one or more social network circuits including users K through P. However, social networking server 316 may provide social network based conferencing functionality independently of any social network circuit functionality.

User M may provide preference data to social networking server 316 specifying that user M would like to create a conference amongst any users engaged in file sharing at certain times. If, at the specified times, users K through P are engaged in file sharing, then, based on session data indicating the file sharing, social network server 316 may create a social network conference based on the specified file sharing activity. Server 316 may provide a conference participant list to messaging server 314, which sends one or more notifications to the requisite users. For example, messaging server 314 may send an invitation to users K through P to join in the conference via messaging connections 114 and messaging client applications 342.

User M may provide additional social network parameters limiting participation in the conference. For example, if user M specifies that the conference is only to include users within two degrees of separation from user M, then user P will not be included in the conference. Similarly, if such a conference is created and user L sends a reply message only to those within one degree of separation from user L, only users K and M will receive L's reply.

As another example, assume that user O wishes to engage in a conference, but has not provided any notification or conference creation pre-settings. Instead, user O provides parameters for possible conferences. For each parameter set, application 340 renders a filtered view of the social network. For example, user O may wish to create a conference including users within one degree of separation from user O, but only those users who are also sharing content on a particular topic ("Vacation"). Assume that users K, M, and P are currently sharing vacation photos via respective instances of P2P client 344. Server 316 is aware of the sharing content based on session data provided by respective instances of social network client application 340. Based on user O's preference data, social network server 316 determines that users K and P are both within one degrees of separation of O and sharing "Vacation" related content. O's instance of application 40 renders a view of social network 300 indicating possible participants in the conference. O sends a message ("Hey, let's talk about vacation") and, pending acceptance by K and P, a conference including users K, O, and P is created and tracked by social network server 316. As the conference progresses, messages are received by messaging server 314, which provides message metadata to social network server 316 and receives distribution lists for messages and replies. Conferencing application 340, messaging client 342, and P2P client 344 could be configured to interact to support drag-and-drop content sharing amongst the conference participants using interfaces such as those illustrated in FIG. 5.

O may provide additional parameters when defining the conference. For example, O may specify a participation threshold whereby the conference will not be initiated unless a certain number of invitees actually participate in the conference. Thresholds could be dependent on multiple parameters—for instance, O may want a certain number of participants from a specified group, a certain number of participants meeting social network parameters (degree of separation, etc.). In some embodiments, regardless of whether thresholds are specified or not, the conferencing system provides feedback as to the conference initiation process. For instance, after inviting various members, O may be presented with a pop-up window and/or other notification(s) of progress. The window may indicate, for example, which members have received invitations, which members are in the process of responding, and the response(s) received.

In this example, social network server 316 tracks conference participation, message distribution lists, and reply distribution lists, but one of skill in the art will recognize that some functionality may be handled by one or more other servers. For example, social network server 316 may be configured to manage underlying social network rules, preferences, and relationships, while one or more separate servers are configured to handle the tracking and management of ongoing conferences.

Furthermore, in these examples, P2P content sharing did not involve a central server. However, if a central content sharing server or other device(s) acting in such a capacity were involved, social network server 316 could obtain session data wholly or in part from such a server for use in providing content sharing functionality as part of social network conferences.

It is appreciated by persons skilled in the art that what has been particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed:

1. A method for initiating a conference, the method comprising:
   receiving, by a messaging server, a request from a first user to initiate a real-time instant messaging conference, the request including a separation degree identifier identifying a desired degree of separation from the first user, wherein the desired degree of separation is at least two degrees of separation;
   accessing, by the messaging server, social network data that identifies acquaintance designations made by users of the messaging server, each acquaintance designation identifying a designating user and a designee user;
   identifying, based on the social network data, a plurality of other users that is within the desired degree of separation from the first user, each user of the plurality of other users being identified as the designee user within a chain of acquaintance designations starting from the first user, each designee user in the chain of acquaintance designations comprising one degree of the desired degree of separation;
   automatically initiating, by the messaging server, the real-time instant messaging conference between the first user and at least some of the plurality of other users;
   receiving, by the messaging server, a message from the first user;
   distributing, by the messaging server, the message to the at least some of the plurality of other users;
   receiving from the first user a second message and metadata identifying a second separation degree identifier identifying a second desired degree of separation from the first user, wherein the second separation degree identifier is different from the separation degree identifier, identifying a second plurality of other users that is within the second desired degree of separation from the first user, wherein the second plurality of other users is a subset of the plurality of other users; and
   sending the second message only to the second plurality of other users.

2. The method of claim 1, wherein initiating the real-time instant messaging conference further comprises obtaining a conference identifier uniquely identifying the real-time instant messaging conference.

3. The method of claim 1, wherein the real-time instant messaging conference is initiated at a first time, further comprising storing a plurality of messages received from the first user or the plurality of other users, determining that an additional user has joined the real-time instant messaging conference at a second time, wherein the second time is after the first time, and automatically distributing the plurality of messages to the additional user upon determining that the additional user has joined the real-time instant messaging conference.

4. A computer program product comprising at least one non-transitory computer-readable medium embodying program instructions, which, when executed by one or more computing devices, configure the one or more computing devices to perform actions including:

receiving a request from a first user to initiate a real-time instant messaging conference, the request including a separation degree identifier identifying a desired degree of separation from the first user, wherein the desired degree of separation is at least two degrees of separation;

accessing social network data that identifies acquaintance designations made by users of the messaging server, each acquaintance designation identifying a designating user and a designee user;

identifying, based on the social network data, a plurality of other users that are within the desired degree of separation from the first user, each user of the plurality of other users being identified as the designee user within a chain of acquaintance designations starting from the first user, each designee user in the chain of acquaintance designations comprising one degree of the desired degree of separation;

automatically initiating the real-time instant messaging conference between the first user and at least some of the plurality of other users;

receiving, by a messaging server, a message from the first user;

distributing, by the messaging server, the message to the at least some of the plurality of other users;

receiving from the first user a second message and metadata identifying a second separation degree identifier identifying a second desired degree of separation from the first user, wherein the second separation degree identifier is different from the separation degree identifier, identifying a second plurality of other users that is within the second desired degree of separation from the first user, wherein the second plurality of other users is a subset of the plurality of other users; and sending the second message only to the second plurality of other users.

5. The computer program product of claim 4, wherein initiating the real-time instant messaging conference further comprises obtaining a conference identifier uniquely identifying the real-time instant messaging conference.

6. The computer program product of claim 4, wherein the real-time instant messaging conference is initiated at a first time, and wherein the program instructions configure the one or more computing devices to perform actions further comprising storing a plurality of messages received from the first user or the plurality of other users, determining that an additional user has joined the real-time instant messaging conference at a second time, wherein the second time is after the first time, and automatically distributing the plurality of messages to the additional user upon determining that the additional user has joined the real-time instant messaging conference.

7. A computing device, wherein the computing device is configured to access stored instructions that configure the computing device to perform activities including:

receiving a request from a first user to initiate a real-time instant messaging conference, the request including a separation degree identifier identifying a desired degree of separation from the first user, wherein the desired degree of separation is at least two degrees of separation;

accessing social network data that identifies acquaintance designations made by users of the messaging server, each acquaintance designation identifying a designating user and a designee user;

determining, based on the social network data, a plurality of other users that is within the desired degree of separation from the first user, each user of the plurality of other users being identified as the designee user within a chain of acquaintance designations starting from the first user, each designee user in the chain of acquaintance designations comprising one degree of the desired degree of separation;

automatically initiating the real-time instant messaging conference between the first user and at least some of the plurality of other users;

receiving a message from the first user;

distributing the message to the at least some of the plurality of other users;

receiving from the first user a second message and metadata identifying a second separation degree identifier identifying a second desired degree of separation from the first user, wherein the second separation degree identifier is different from the separation degree identifier, identifying a second plurality of other users that is within the second desired degree of separation from the first user, wherein the second plurality of other users is a subset of the plurality of other users; and sending the second message only to the second plurality of other users.

8. The computing device of claim 7, wherein initiating the real-time instant messaging conference further comprises obtaining a conference identifier uniquely identifying the real-time instant messaging conference.

9. The computing device of claim 7, wherein the real-time instant messaging conference is initiated at a first time, and wherein the stored instructions further configure the computing device to perform activities comprising storing a plurality of messages received from the first user or the plurality of other users, determining that an additional user has joined the real-time instant messaging conference at a second time, wherein the second time is after the first time, and automatically distributing the plurality of messages to the additional user upon determining that the additional user has joined the real-time instant messaging conference.

* * * * *